(12) United States Patent
Roy et al.

(10) Patent No.: US 8,140,687 B2
(45) Date of Patent: Mar. 20, 2012

(54) PERFORMANCE ENHANCING PROXY HANDOVER

(75) Inventors: Satyajit Roy, Gaithersburg, MD (US); Douglas Dillon, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 186 days.

(21) Appl. No.: 12/508,931

(22) Filed: Jul. 24, 2009

(65) Prior Publication Data
US 2010/0121957 A1 May 13, 2010

Related U.S. Application Data

(60) Provisional application No. 61/114,299, filed on Nov. 13, 2008.

(51) Int. Cl.
*G06F 15/16* (2006.01)

(52) U.S. Cl. ........................... 709/227; 370/236

(58) Field of Classification Search .............. 709/227; 370/236
See application file for complete search history.

(56) References Cited

U.S. PATENT DOCUMENTS 6,975,647 B2 * 12/2005 Neale et al. .................. 370/466
7,680,051 B2 * 3/2010 Kumar et al. ................ 370/236
* cited by examiner

*Primary Examiner* — Adnan Mirza
(74) *Attorney, Agent, or Firm* — Ditthavong Mori & Steiner, P.C.

(57) ABSTRACT

An approach is provided for graceful shutdown and startup of spoofing when a handover procedure is performed. A handover of a performance enhancing proxy (PEP) session associated with a transport connection is detected. A shutdown procedure is initiated to stop spoofing of the transport connection in response to the detected handover. The shutdown procedure avoids teardown of the transport connection during the handover from a first link to a second link of a communication system.

20 Claims, 7 Drawing Sheets

TCP CONNECTION

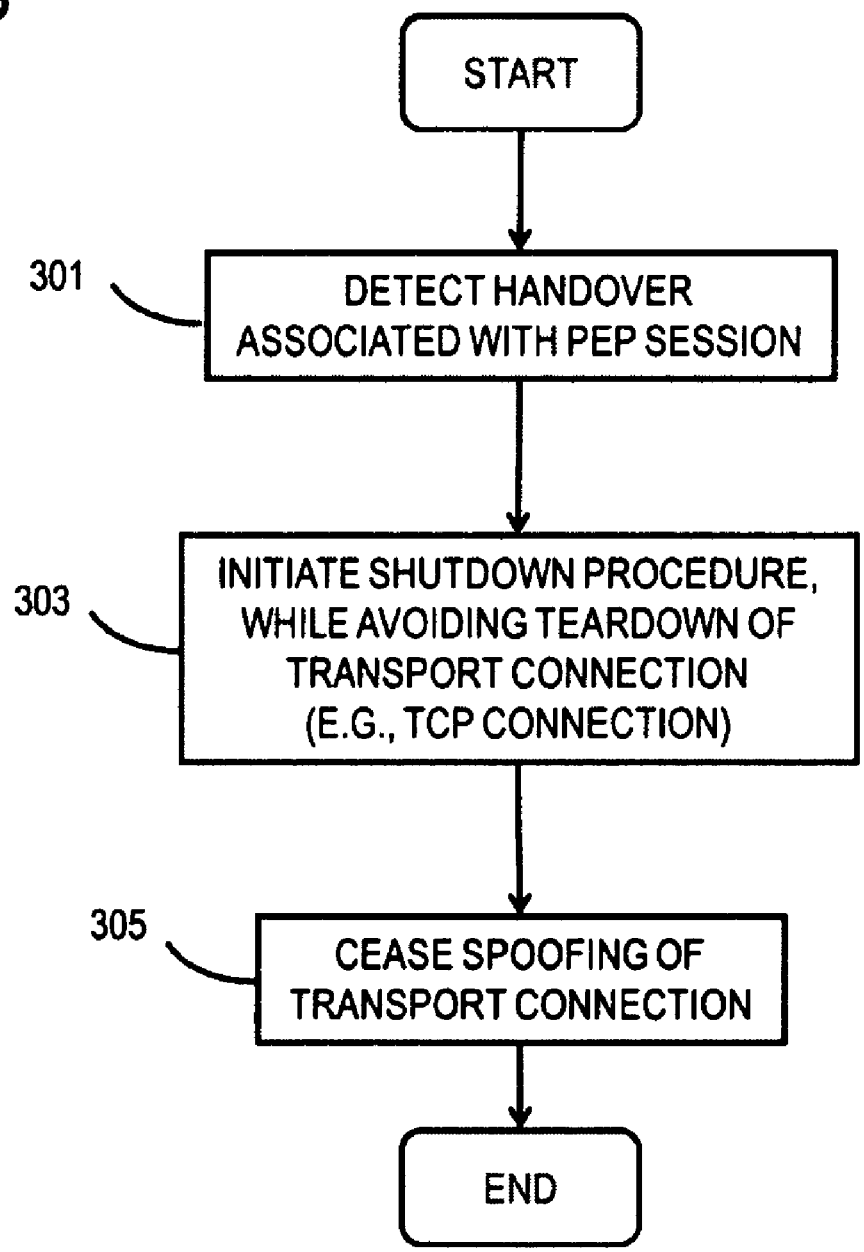

PERFORMANCE ENHANCING PROXY HANDOVER

RELATED APPLICATIONS

The present invention claims the benefit of priority under 35 U.S.C. §119(e) of U.S. Provisional Patent Application Ser. No. 61/114,299, the entire contents of which are hereby incorporated by reference.

The contents of U.S. Pat. Nos. 6,161,141; 7,219,158 and 7,006,480 are hereby incorporated by reference.

FIELD OF THE INVENTION

The invention relates to enhancing performance of a communications system.

BACKGROUND INFORMATION

The entrenchment of data networking into the routines of modern society, as evidenced by the prevalence of the Internet, particularly the World Wide Web, has placed ever-growing demands on service providers to continually improve network performance and user response time. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks. Furthermore, mobility of devices have posed further challenges in that the handover procedure involving the transition from one network (or service area) into another network typically require tearing down existing connections and establishing new ones. Such reestablishment of connections is expensive, in terms of signaling overhead and delay.

Therefore, there is a need for an approach that provides efficient treatment of connections during handovers.

SOME EXEMPLARY EMBODIMENTS

According to one embodiment, a method comprises detecting a handover of a performance enhancing proxy (PEP) session associated with a transport connection; and initiating a shutdown procedure to stop spoofing of the transport connection in response to the detected handover. The shutdown procedure avoids teardown of the transport connection during the handover from a first link to a second link of a communication system.

According to another embodiment, an apparatus comprises a processor configured to detect a handover of a performance enhancing proxy (PEP) session associated with a transport connection, wherein the processor is further configured to initiate a shutdown procedure to stop spoofing of the transport connection in response to the detected handover, the shutdown procedure avoiding teardown of the transport connection during the handover from a first link to a second link of a communication system.

According to yet another embodiment, a system comprises a first performance enhancing proxy (PEP) end point configured to provide a spoofed transport protocol connection utilized by a mobile terminal. The system also comprises a second PEP end point configured to communicate with the first PEP end point, wherein the PEP end points are further configured to stop spoofing, in response to initiation of a handover procedure of the mobile terminal, of the transport protocol connection without teardown of the transport protocol connection.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are, respectively, a diagram of a communication system capable of provide performance enhancing proxy (PEP), and a handover process utilized in the system of FIG. 3A, according to various embodiments;

DESCRIPTION OF THE PREFERRED EMBODIMENT

A preferred apparatus, method, and software for providing performance enhancing proxy session handover are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the present invention is discussed with respect to the Internet and the TCP/IP protocol suite, the present invention has applicability to other packet switched networks and equivalent protocols.

As will be further detailed below, a communication system 100 (of FIG. 3) provides graceful shutdowns of spoofing on an existing network connection, and graceful start or acceleration of spoofing from the middle of an unaccelerated transport (e.g., TCP) connection. Thus, after handover to, e.g., a satellite link any existing non-spoofed connections can become accelerated without tearing down the connections, and any spoofed connections remain so in the new link.

To better appreciate the various embodiment of the present invention, it is instructive to describe the TCP/IP protocol suite, and the traditional TCP three-way handshake.

Figure 1:
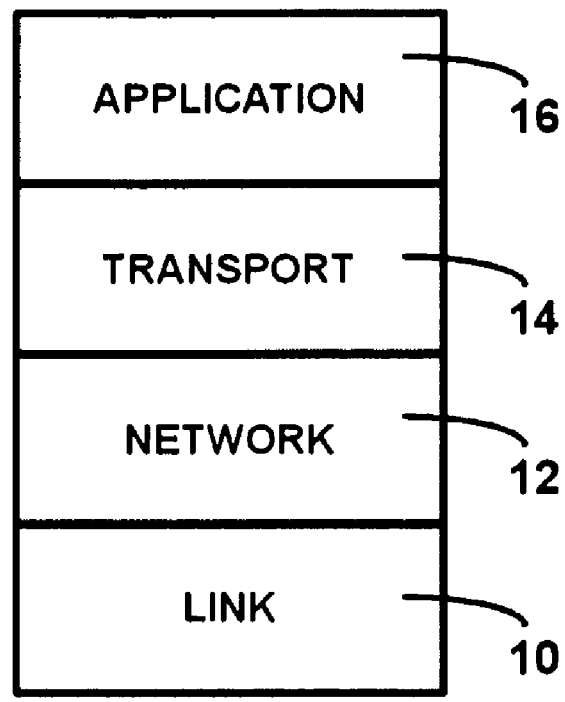
FIG. 1 is a diagram of the protocol layers of the TCP/IP (Transmission Control Protocol/Internet Protocol) protocol suite.

FIG. 1 is a diagram of the protocol layers of the TCP/IP (Transmission Control Protocol/Internet Protocol) protocol suite. As the networking standard for the global Internet, TCP/IP has earned such acceptance among the industry because of its flexibility and rich heritage in the research community. The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 1. As illustrated, the link layer (or the network interface layer) 10 includes device drivers in the operating system and any corresponding network interface cards. Together, the device driver and the interface cards handle hardware details of physically interfacing with any cable or whatever type of media that is being used. The network layer (also referred to as the Internet layer) 12 handles the movement of packets around the network. Routing of packets, for example, takes place at the network layer 12. IP, Internet control message protocol (ICMP), and Internet group management protocol (IGMP) may provide the network layer in the TCP/IP protocol suite. The transport layer 14 provides a flow of data between two hosts, for the application layer 16 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 16 into appropriately sized segments for the network layer 12 below, acknowledging received packets, setting timeouts to make certain the other end acknowledges packets that are sent, and so on. Because this reliable flow of data is provided by the transport layer 14, the application layer 16 is isolated from these details. UDP, on the other hand, provides a much simpler service to the application layer 16. UDP just sends packets of data called datagrams from one host to another, with no guarantee that the datagrams will reach their destination. Any desired reliability must be added by a higher layer, such as the application layer 16.

The application layer 16 handles the details of the particular application. There are many common TCP/IP applications that almost every implementation provides, including telnet for remote log-in, the file transfer protocol (FTP), the simple mail transfer protocol (SMTP) or electronic mail, the simple network management protocol (SNMP), the hypertext transfer protocol (HTTP), and many others.

As mentioned, TCP provides reliable, in-sequence delivery of data between two IP hosts. The IP hosts set up a TCP connection, using a conventional TCP three-way handshake and then transfer data using a window based protocol with the successfully received data acknowledged.

Figure 2:
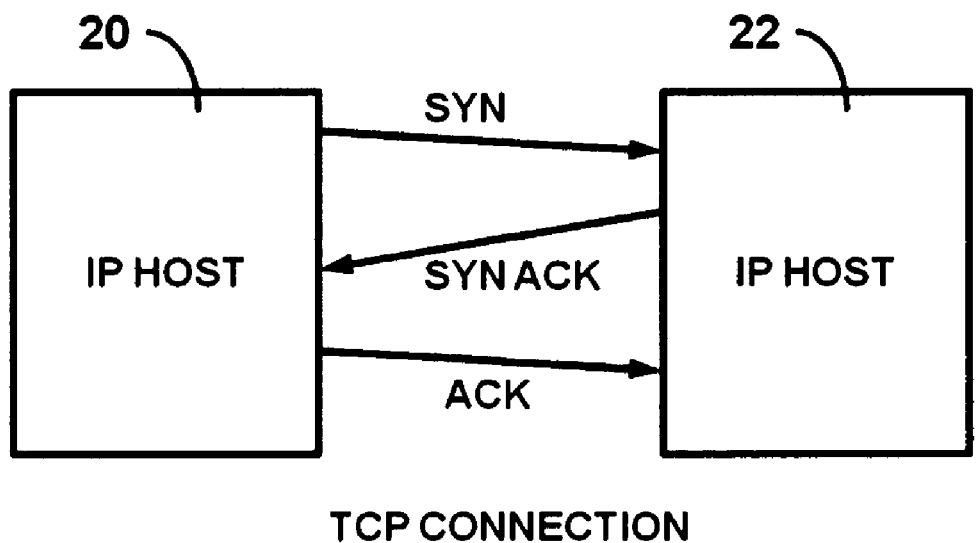
FIG. 2 is a diagram of a conventional TCP three-way handshake between IP hosts.

FIG. 2 is a diagram of a conventional TCP three-way handshake between IP hosts. First, the IP host 20 that wishes to initiate a transfer with IP host 22, sends a synchronize (SYN) signal to IP host 22. The IP host 22 acknowledges the SYN signal from IP host 20 by sending a SYN acknowledgement (SYN-ACK). The third step of the conventional TCP three-way handshake is the issuance of an ACK signal from the IP host 20 to the other IP host 22. At this point, IP host 22 is ready to receive the data from IP host 20 (and vice versa). After all the data has been delivered, another handshake (similar to the handshake described to initiate the connection) is used to close the TCP connection.

TCP was designed to be very flexible and to work over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses. Such flexibility is achieved at the cost of sub-optimal operation in a number of environments vis-a-vis a tailored protocol. The tailored protocol, which is usually proprietary in nature, may be more optimal, but greatly lacks flexibility in terms of networking environments and interoperability.

An alternative to a tailored protocol is the use of performance enhancing proxies (PEPs), to perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance.

Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Many TCP PEP implementations are based on TCP ACK manipulation. These may include TCP ACK spacing where ACKs which are bunched together are spaced apart, local TCP ACKs, local TCP retransmissions, and TCP ACK filtering and reconstruction. Other PEP mechanisms include tunneling, compression, and priority-based multiplexing.

Figure 3A:
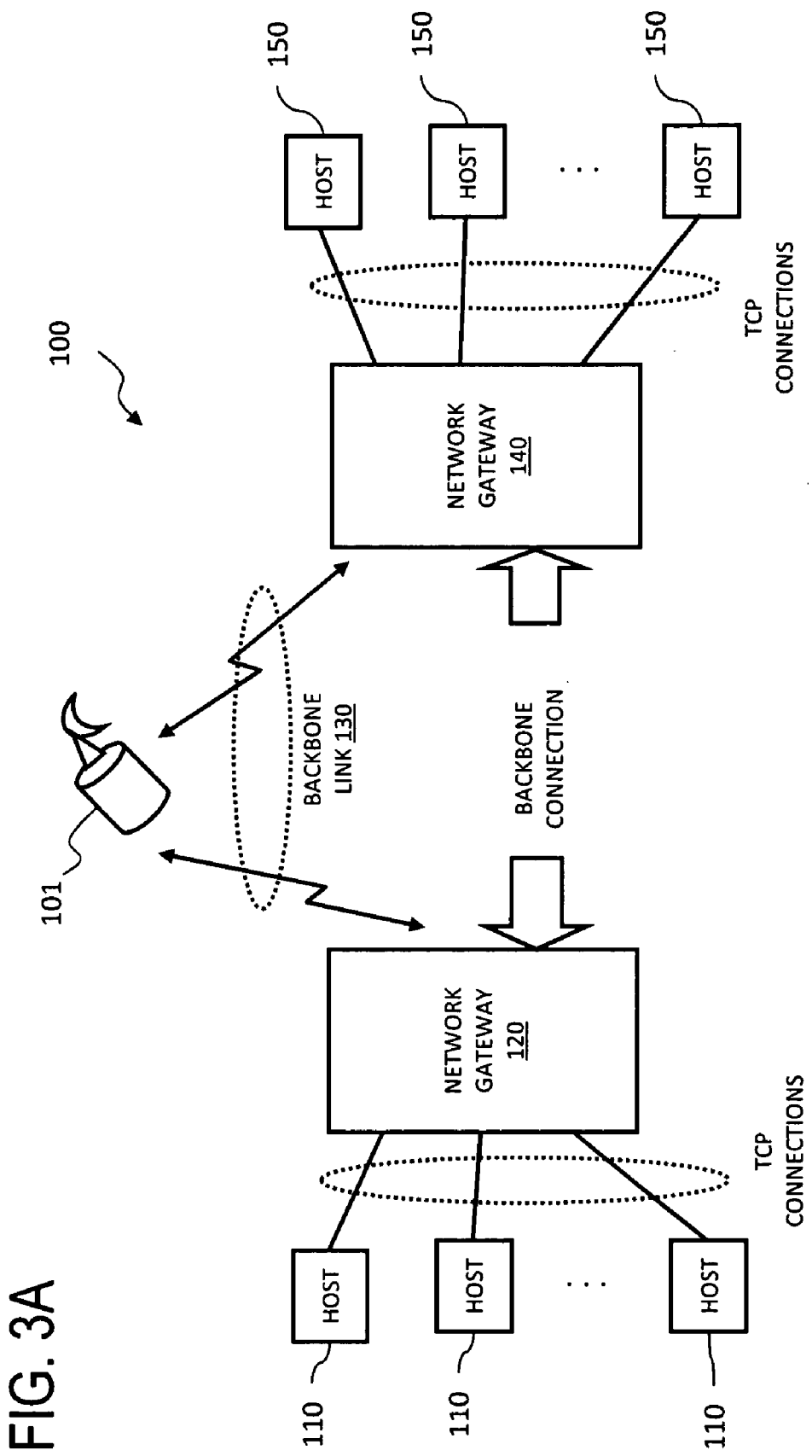

FIGS. 3A and 3B are, respectively, a diagram of a communication system capable of provide performance enhancing proxy (PEP), and a handover process utilized in the system of FIG. 3A, according to various embodiments. As shown in FIG. 3A, the network 100 in FIG. 1 includes one or more hosts 110 connected to a network gateway 120 via TCP connections. The network gateway 120 is connected to another network gateway 140 via a backbone connection on a backbone link 130. As seen in FIG. 3A, the backbone link 130, in an exemplary embodiment, is shown as a satellite link that is established over a satellite 101; however, it is recognized by one of ordinary skill in the art that other network connections may be implemented. For example, these network connections may be established over a wireless communications system, in general, (e.g., radio networks, cellular networks, etc.) or a terrestrial communications system. The network gateway 140 is further connected to a second group of hosts 150, also via TCP connections. In the arrangement illustrated in FIG. 3A, the network gateways 120, 140 facilitate communication between the groups of hosts 110, 150.

The network gateways 120, 140 facilitate communication between the two groups of hosts 110, 150 by performing a number of performance enhancing functions. These network gateways 120, 140 may perform selective TCP spoofing, which allows flexible configuration of the particular TCP connections that are to be spoofed. Additionally, gateways 120, 140 employ a TCP three-way handshake, in which the TCP connections are terminated at each end of the backbone link 130. Local data acknowledgements are utilized by the network gateways 120, 140, thereby permitting the TCP windows to increase at local speeds.

The network gateway 120, 140 further multiplexes multiple TCP connections across a single backbone connection; this capability reduces the amount of acknowledgement traffic associated with the data from multiple TCP connections, as a single backbone connection acknowledgement may be employed. The multiplexing function also provides support for high throughput TCP connections, wherein the backbone connection protocol is optimized for the particular backbone link that is used. The network gateways 120, 140 also support data compression over the backbone link 130 to reduce the amount of traffic to be sent, further leveraging the capabilities of the backbone connection. Further, the network gateways 120, 140 utilize data encryption in the data transmission across the backbone link 130 to protect data privacy, and provide prioritized access to backbone link 130 capacity on a per TCP connection basis. Each of the network gateways 120, 140 may select a particular path for the data associated with a connection to flow.

FIG. 3B shows a flowchart of a handover process that provides graceful shutdown of connections, according to certain embodiments. Under this scenario, it is assumed that a mobile terminal is engaged in a TCP spoofed session on one link of the communication system 100, and moves into another coverage area such that another link is to be utilized, thereby initiating a handover (or handoff) procedure. In step 301, the process detects a handover procedure associated with a PEP session. Thereafter, a shutdown procedure is initiated for the connections of the PEP session, whereby the tear down of the transport connection, e.g. TCP connection, is avoided (step 303). This shutdown procedure can cease spoofing of the transport connection, per step 305. In this manner, a "soft" handover can be achieved.

As noted, TCP Performance Enhancing Proxy (TCP PEP) improves TCP application performance over a high delay link (e.g., satellite link), as well as enhancing TCP PEP to support mobility. In a mobile environment, a user terminal can, for example, move from (1) a spoofing enabled wireless link to another spoofing enabled link—where spoofing is terminated before handover and then begin again after handover; (2) a wireless link that does not have spoofing capability to a spoofing enabled link—where spoofing begins on preexisting TCP connections after handover; and (3) a spoofing enabled wireless link to another link which does not have TCP spoofing capability—where spoofing is terminated without tearing down TCP connections before handover.

According to certain embodiments, the above process provides "graceful" acceleration shutdown of ongoing TCP PEP sessions as well as graceful acceleration start of existing TCP connections. Graceful shutdown, in one embodiment, entails that a spoofed TCP connection is not torn down on handover, and any existing spoofed or non-spoofed TCP sessions can continue to be accelerated after handover if the new link supports spoofing capability.

Figure 4:
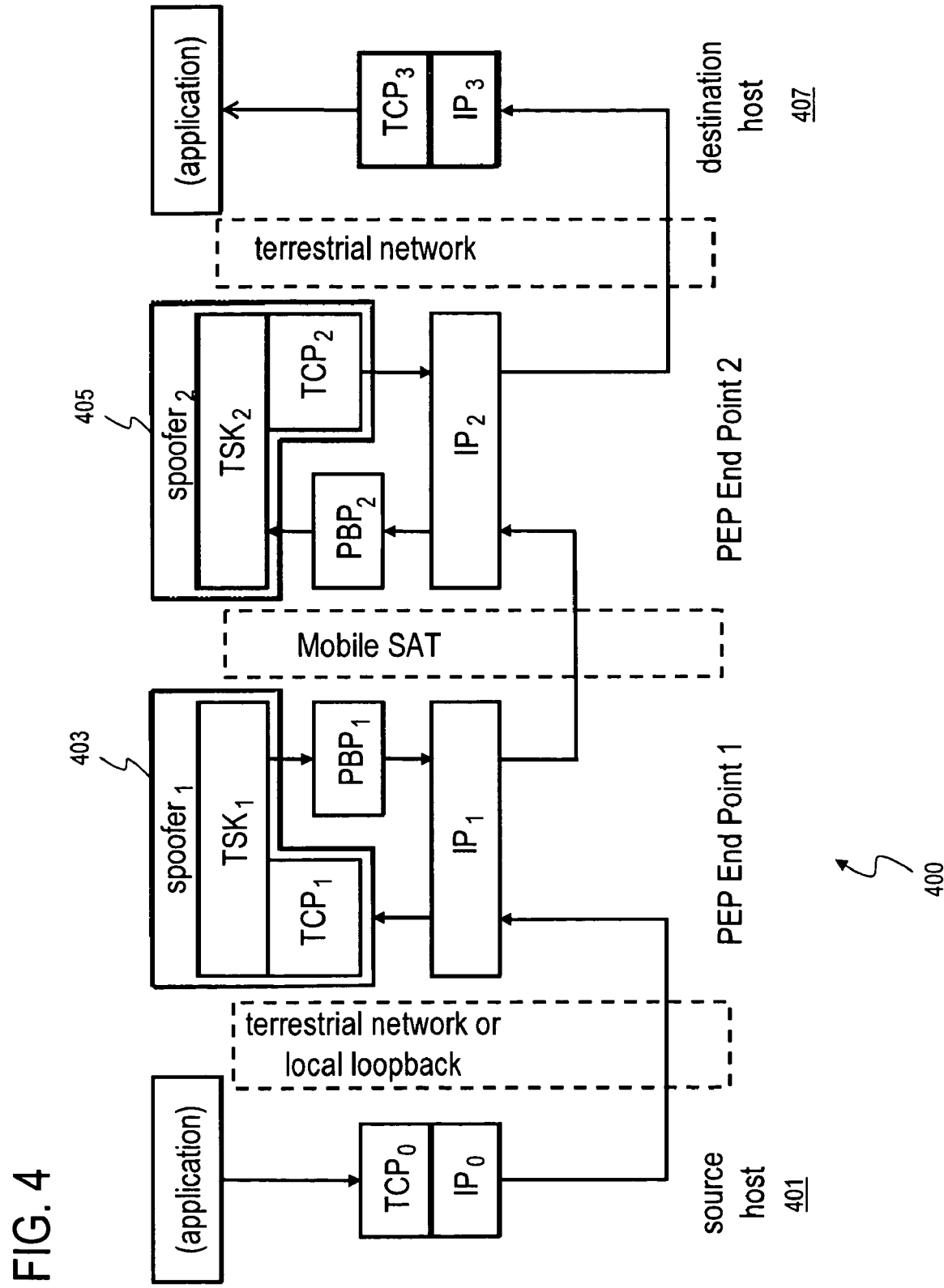
FIG. 4 is a diagram of a data flow according to a TCP spoofing process, according to an exemplary embodiment.

FIG. 4 is a diagram of a data flow according to a TCP spoofing process, according to an exemplary embodiment. By way of example, the TCP spoofing process is explained with respect to a mobile satellite configuration 400. The design for TCP spoofing in mobile satellite (SAT) splits the end-to-end TCP connection, resulting in three tandem connections between the end hosts. In this "split TCP" scheme, each host uses whatever version of TCP it has. The TCP connection from a source host 401 extends to an associated source S-BSS or mobile (i.e., end point) 403 and is terminated at a destination S-BSS or mobile (endpoint) 405. The TCP data from that flow is sent by the source S-BSS or mobile to a destination mobile or S-BSS using a reliable protocol. Appropriate information describing the TCP connection is also sent so that the destination radio end point (mobile or S-BSS) 405 can use TCP to transport the data to the ultimate destination host 407 as intended by the source. Thus, a TCP connection is split into two terrestrial TCP connections joined by a third connection over the satellite link.

A backbone connection is established between two radio end points to support carrying spoofed data between them. Besides carrying all spoofer messages, all spoofed TCP connections between the respective radio end points are multiplexed over such common backbone connections. This allows spoofing TCP's 3-way handshake and greatly reduces the time to establish a TCP connection. The protocol used to reliably communicate over the backbone connection is called the PEP Backbone Protocol (PBP). This protocol over the space link does not operate outside the radio system, and so can be tailored specifically for long delay satellite networks. A PBP connection is just the aforementioned backbone connection.

In FIG. 4, the arrows show the path traveled by data from one application to another through spoofing. The spoofer resides at the radio end points, and backbone connections extend between them. The spoofer accepts incoming TCP/IP datagrams, and "spoofs" the sending TCP by sending it TCP acknowledgements even though the data thereby acknowledged has not yet actually been delivered to the ultimate destination. The spoofer functions in a manner that leads the sender and receiver end-hosts to believe that they are communicating with each other, when instead they are communicating with the local spoofers.

The spoofer is compatible with TCP, and reduces the round-trip time (RTT) perceived by the sender and the receiver by locally acknowledging the receipt of TCP data. The reduction of the perceived RTT value can be an important benefit for satellite communications, because TCP congestion control responds to measurements taken on a RTT basis. Also, spoofing allows TCP to quickly escape its "slow-start" operational regime which otherwise would severely restrict initial throughput, due to a large RTT.

The spoofer conceptually comprises a TCP implementation that communicates with an end host which can be terrestrially connected to the end host (S-BSS or UT when acts as a Gateway) or can reside in the same place with the host (Handheld, PDA types of UTs), and a TCP spoofing kernel (TSK) which manages communication between that TCP implementation and PBP. A TCP spoofing manager, in one embodiment, resides on each end of the satellite link in order to provide an end-to-end spoofed TCP connection.

The system of FIG. 4 allows a PEP session to be handed over from one link to another link, gracefully. The links can be similar, such as satellite link to satellite link handover, or different, such as terrestrial link to satellite link handover. Instead, after handover, all of the existing non-spoofed TCP sessions can be unaccelerated (even when the new link is spoofing capable). A graceful shutdown of spoofing refers to a process which ensures that the original spoofed TCP connection continues unaccelerated after the stoppage of spoofing. The TCP connection in this instance is not reset, but rather continued unspoofed.

Figure 5:
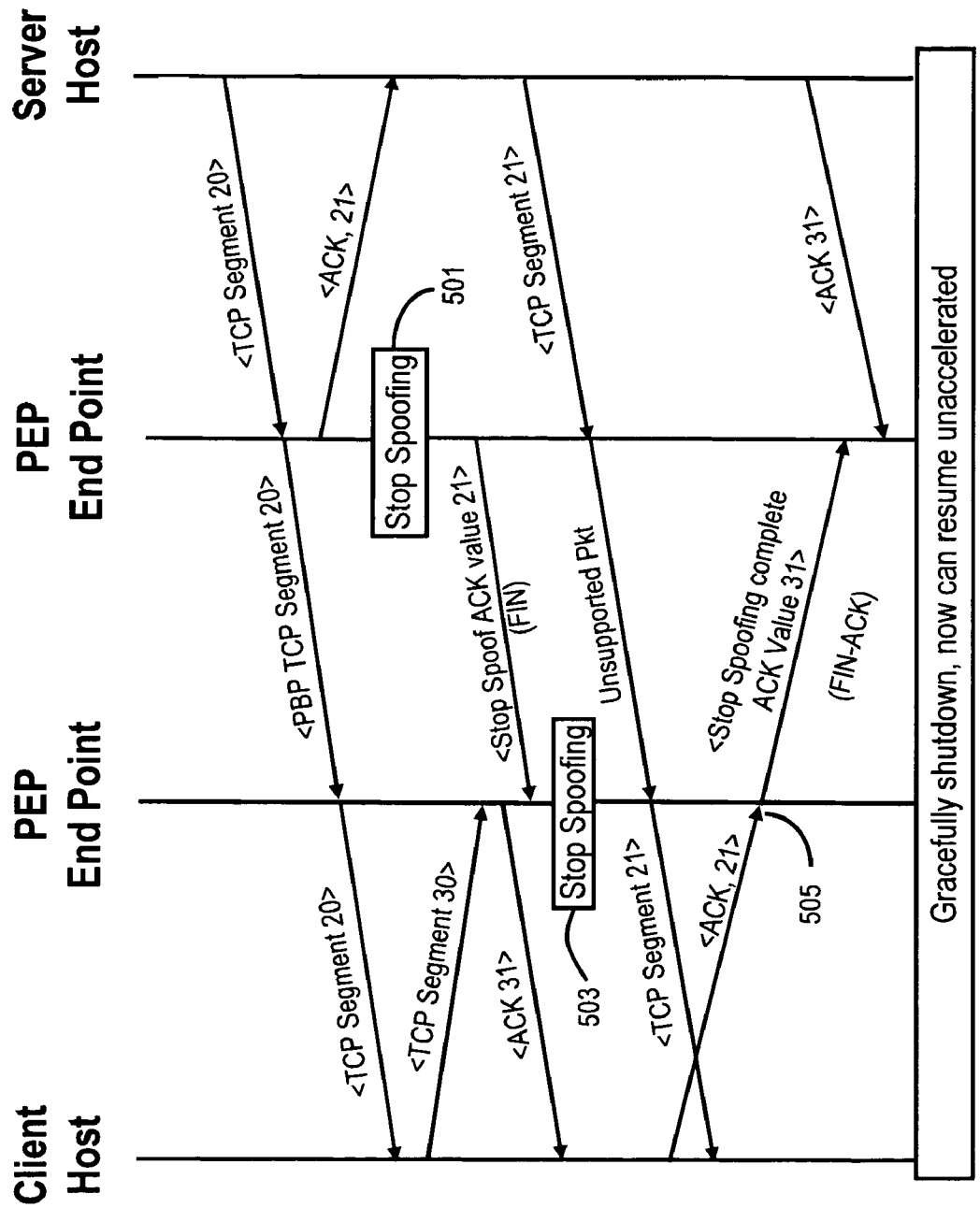
FIG. 5 is a ladder diagram of a process for providing graceful stoppage of TCP spoofing, according to an exemplary embodiment.

FIG. 5 is a ladder diagram of a process for providing graceful stoppage of TCP spoofing, according to an exemplary embodiment. As shown, a client end host initiates a TCP connection, wherein a server end host receives the initiated TCP connection request. Two PEP end points are interspersed between the client end host and the server end host. In this example, TCP sequence numbers are considered on a per packet. stop spoofing handshake messages are exchanged between peer PEP end points (i.e., client and server PEP end points) to achieve a graceful shutdown of a TCP PEP session.

In certain embodiments, a graceful stoppage of spoofing can occur when the following conditions are satisfied. Spoofing of an existing connection can be shutdown gracefully when one PEP end point has sent a spoofed acknowledge (ACK) for a TCP segment n to its side end host, and the peer PEP end point (the other end point of the PEP backbone) has received the ACK from its side end host for that segment n. This ensures that the segment n for which the sender has received the spoofed ACK has reached the receiver. As a result, the original TCP connection survives and continues either in accelerated or unaccelerated mode. Only after spoofing has been shutdown as a result of the ACK from both end points is the system synchronized and handover can occur.

Under the scenario of FIG. 5, an end device (such as a mobile device) moves, for example, from a first network to a second network, such that a handover (or handoff) from network to network occurs. The graceful shutdown procedure occurs as follows, according to one embodiment. Initially, in this example, the server host sends a TCP segment (e.g., sequence number, n=20) to the PEP end point entity on the server side; because spoofing is enabled, the PEP end point responds with an acknowledgement (e.g., ACK, 21), while the TCP segment 20 is forwarded over the PEP backbone connection to another PEP entity on the client side. This PEP entity then forwards TCP segment 20 to a client host.

After receiving a handover trigger from an external entity, for example a S-BSS entity that is external to PEP end point entity, such as Mobility Management entity, the PEP end point on the server side initiates a TCP spoofing stop event ('Stop Spoofing'), per step 501. The PEP end point on the server side stores the last segment (TCP Segment 20) being ACK'ed towards the server end host. Here, the S-BSS side hosts the service side PEP end point, and the mobile terminals host the client side PEP end point.

Thereafter, the server side PEP end point sends a "Stop Spoofing" message over the PEP backbone connection, along with the last spoof ACK value (ACK, 21), to the peer PEP end point. The server side PEP end point terminates use of the PEP backbone connection to forward any further TCP segments (TCP Segment 21) received from the server end host. That is, all TCP messages sent from the server end host are sent unspoofed. For a graceful stoppage of spoofing at this point, the TCP segments and associated ACKs are to have been received by the client end host (TCP segments up to 20).

After receiving the "Stop Spoof" message from the server side PEP end point, the client side PEP end point stops TCP spoofing (step 503). At this time, the client PEP end point stores the last segment being ACK'ed towards the client end host. At this point, spoofing is shutdown. That is, the client side PEP end point does not use the PEP backbone connection to forward any TCP segments received from the client end host, i.e., all TCP messages are sent unspoofed. When the client side PEP end point receives an acknowledgement message (<ACK, 21>) from the client end host, the client host has received all TCP segments up to sequence number 20.

In step 505, after receiving <ACK, 21>, the client side PEP end point sends a "Stop spoofing complete" message over the PEP backbone connection along with spoof ACK value (<ACK 31>) to the server side PEP end point. When the server side PEP end point receives the "stop spoofing complete" message from the peer PEP end point, graceful shutdown of spoofing can being if the PEP end point has received the acknowledgement message (<ACK,31>) from the server end host. If it has not yet received <ACK, 31>, the PEP end point waits until receipt of the acknowledgement message from the server end host. At this time, graceful shutdown of spoofing is ensured.

Figure 6:
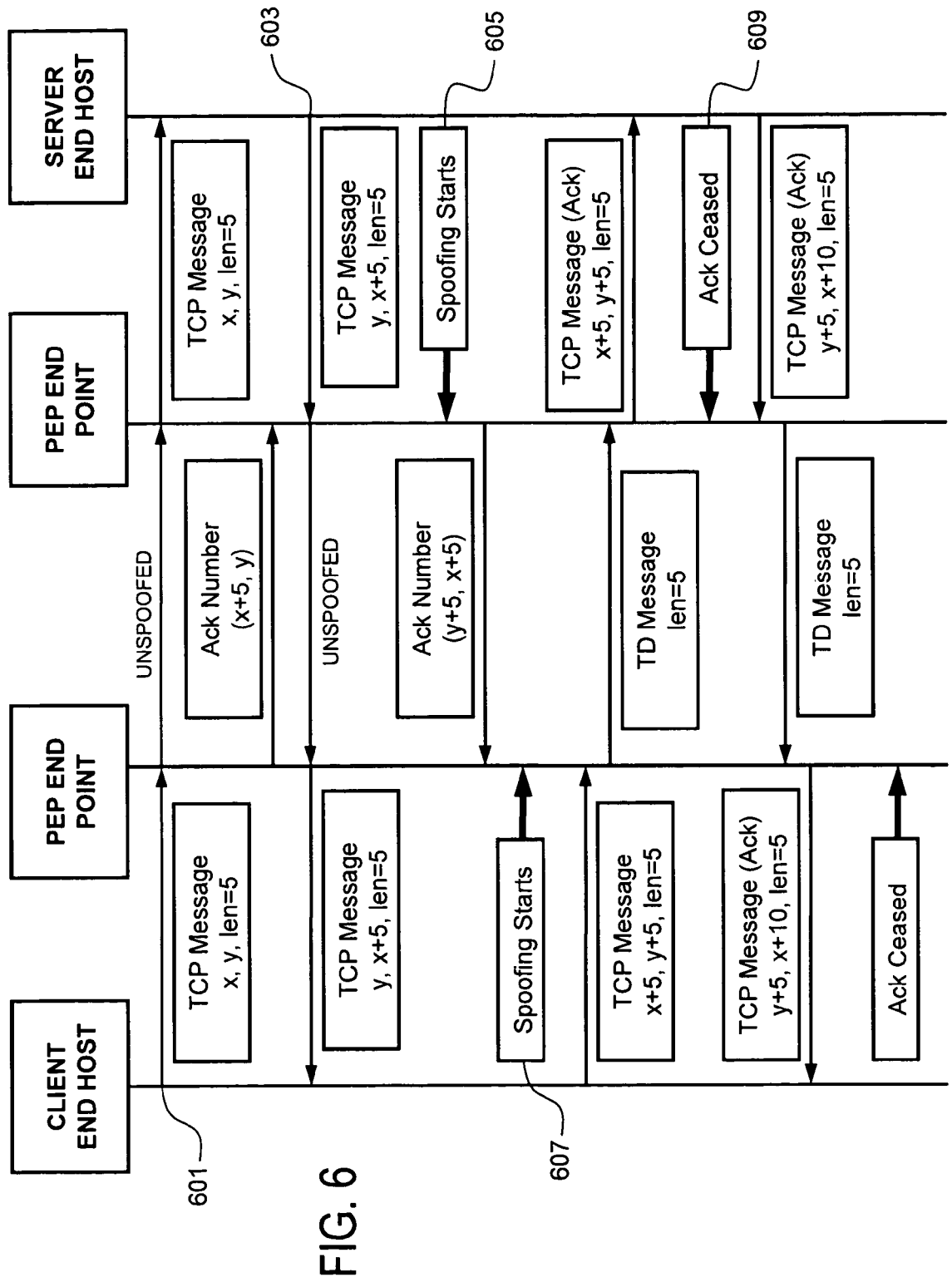
FIG. 6 is a ladder diagram of a process for providing graceful start of TCP spoofing, according to an exemplary embodiment.

FIG. 6 is a ladder diagram of a process for providing graceful start of TCP spoofing, according to an exemplary embodiment. In this example, a handshake process is executed between two PEP end points (i.e., the backbone connection) in order to allow the existing TCP connection to begin spoofing. On a TCP session, although initiated from one of the end hosts (i.e., client and server hosts), data can be exchanged in both directions. If, however, one of the end hosts does not have any data to send, received data is still acknowledged by sending an acknowledgment message (ACK message) upon receipt of the data. On the other hand, when data is being exchanged between the end hosts, the data and acknowledgement are sent in the same TCP segment, using, for example, a piggybacking scheme.

As illustrated, two PEP end points (e.g. PEP client end point and PEP server end point) correspond to respective end hosts (e.g. Client End Host and Server End Host). In this example, the client end host initiates a TCP connection with the server end host (step 601). At this point, the messages sent between the two end hosts are unspoofed (step 603).

In step 605, spoofing can begin by one of the two PEP end points when the following conditions are satisfied: (1) when one of the PEP end points learns from the other PEP end point that a TCP segment at the far end host (i.e. the end host that does not correspond to the PEP end point) has been successfully received, (2) the PEP end point knows the next segment the far end host will transmit and the current receive window (included in the ACK message) of the far end host, and (3) the PEP end point receives at least one TCP segment from the near end host (i.e. the end host corresponding to the PEP end point).

As seen in FIG. 6, after handover of a mobile device from a first link to a second link, the server side PEP end point initiates a PEP backbone connection with the client side PEP end point. Prior to the backbone connection being established, any received TCP segments/packets from the end hosts in the PEP end points are discarded.

To ensure that spoofing can start, certain rules are employed. Until these rules are satisfied, messages are sent unspoofed (after the PEP backbone connection is established). TCP data segments received at either of the PEP end points from either of the end hosts are sent unspoofed towards the peer PEP and end points, as in steps 601 and 603. A "reliable" message (e.g., ACK Number) is also sent to the peer PEP end point in addition to the unspoofed TCP segment. According to one embodiment, this message includes a sequence number, an acknowledgement number and window information retrieved from the TCP segment previously sent unspoofed. After the first ACK number is sent, subsequent ACK numbers are only sent when the acknowledgment number changes. Additionally, unspoofed TCP data segments received at the other PEP end point are forwarded to its respective near host.

Furthermore, when a PEP end point receives the first reliable ACK number message, it starts spoofing the connection in the downstream direction (data coming from its near end host), if at least one TCP segment has also been received from its near host. Otherwise, the PEP end point waits for the first TCP segment to be received from its near host before it can start spoofing. Receipt of the first ACK message indicates that the far host has received all TCP segment data up until receipt of the ACK message. At this point, the PEP end point which has received the reliable ACK number message from the peer, and has received at least one TCP segment from its local host, can start locally acknowledging anything thereafter since the links over the satellite and then via the peer PEP to the far peer host are both reliable.

Once spoofing has been started (step 607), the following procedures are followed. If a TCP segment is sent over the PEP backbone connection and has already been ACK'ed, the PEP end points discard it. When a PEP end point receives subsequent ACK number messages, the PEP end point checks whether the acknowledgement number in the ACK number is higher than the current spoofed ACK number for that connection. The spoofing kernel in the PEP end point moves the current spoofed ACK number forward to the ACK number message's number (e.g., the segment that the far side of the end host has acknowledged is newer than the local spoofed ACK from the PEP end point) and discards any out-of-sequence TCP segments which are ACKed by the revised ACK number when the ACK number is higher than the current spoofed ACK number.

In step 609, ACK number transmission from a PEP end point is terminated when it receives the first TCP segment for the connection from the peer PEP end point via the PEP backbone connection. If a PEP end point receives TCP segments from its near host, which has already been ACKed by the far host, the segments are discarded.

In the case where a PEP end point receives an ACK number message, but the actual unspoofed TCP ACK packet was lost prior to reaching the far host, the near host may retransmit the packet, which the PEP end point will discard and return as a spoofed ACK.

It is appreciated that the described processes and systems are not limited to the embodiments described above, and may also be applied to programs such as 3G (Third Generation) mobiles satellite systems, dynamic switching between terrestrial broadband (e.g., Digital Subscriber Line (DSL)) and satellite, broadband to aircraft solutions which will require handovers as the airplane adjusts the direction it is moving, and maritime satellite broadband where a ship shifts from one satellite to another. Additional embodiments, as readily understood by one skilled in the art may also be used in this system.

The processes described herein for providing performance enhancing proxy handover may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
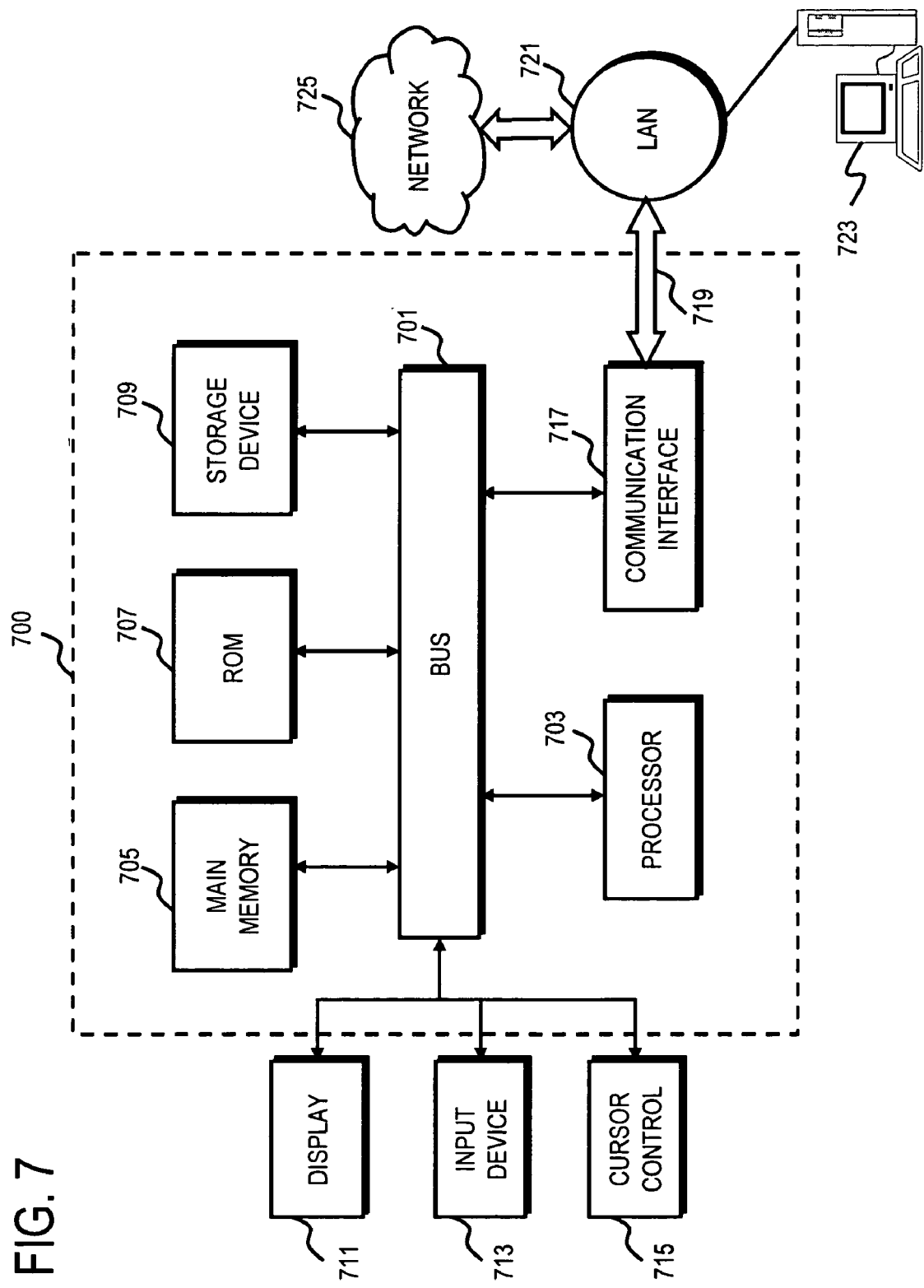
FIG. 7 is a diagram of a computer system that can be used to implement various exemplary embodiments.

FIG. 7 illustrates computing hardware (e.g., computer system) 700 upon which various exemplary embodiments may be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    detecting a handover of a transport connection from a first link to a second link of a communication system, wherein the transport connection over the first link is subject to a performance enhancing proxy (PEP) function, and the handover will result in a replacement of the first link by the second link; and
    initiating a shutdown procedure to cease a spoofing function in response to the detected handover, the shutdown procedure avoiding teardown of the transport connection during the handover from the first link to the second link of the communication system,
    wherein the shutdown procedure comprises:
        generating a first spoof acknowledgement, corresponding to a received data segment, for notification of the stoppage of the spoofing function; and
        transmitting a PEP shutdown message along with the first spoof acknowledgement to a PEP endpoint.

2. A method according to claim 1, wherein the transport connection is according to a transmission control protocol (TCP) and the PEP function comprises TCP spoofing, and wherein the data segment comprises a final TCP segment for transmission under the PEP function.

3. A method according to claim 2, further comprising:
    receiving a PEP shutdown acknowledgement message along with a second spoof acknowledgement corresponding to the first spoof acknowledgement.

4. A method according to claim 3, further comprising:
    receiving another TCP segment; and
    initiating transmission of the other TCP segment without spoofing.

5. A method according to claim 4, wherein the TCP segments are received from a server host for transmission to a client host coupled to the PEP end point.

6. A method according to claim 1, wherein the second link is either a spoofing enabled link or a non-spoofing enable link.

7. A method according to claim 1, further comprising:
    receiving a reliable acknowledgement message; and
    initiating a graceful start of spoofing of the transport connection over the second link in response to the received reliable acknowledgement message.

8. A method according to claim 1, wherein the first link and the second link are wireless links, and the communication system includes a satellite network.

9. An apparatus comprising:
    a processor configured to detect a handover of a transport connection from a first link to a second link of a communication system, wherein the transport connection over the first link is subject to a performance enhancing proxy (PEP) function, and the handover will result in a replacement of the first link by the second link,
    wherein the processor is further configured to execute a shutdown procedure to cease a spoofing function in response to the detected handover, the shutdown procedure avoiding teardown of the transport connection during the handover from the first link to the second link of the communication system,
    wherein the shutdown procedure comprises:
        generating a first spoof acknowledgement, corresponding to a received data segment, for notification of the stoppage of the spoofing function; and
        transmitting a PEP shutdown message along with the first spoof acknowledgement to a PEP endpoint.

10. An apparatus according to claim 9, wherein the transport connection is according to transmission control protocol (TCP) and the PEP function comprises TCP spoofing, and wherein the data segment comprises a final TCP segment for transmission under the PEP function.

11. An apparatus according to claim 10, wherein the processor is further configured to receive a PEP shutdown acknowledgement message along with a second spoof acknowledgement corresponding to the first spoof acknowledgement.

12. An apparatus according to claim 11, wherein the processor is further configured to receive another TCP segment, and to initiate transmission of the other TCP segment without spoofing.

13. An apparatus according to claim 12, wherein the TCP segments are received from a server host for transmission to a client host coupled to the PEP end point.

14. An apparatus according to claim 9, wherein the second link is either a spoofing enabled link or a non-spoofing enable link.

15. An apparatus according to claim 9, wherein the processor is further configured to receive a reliable acknowledgement message, and to initiate a graceful start of spoofing of the transport connection over the second link in response to the received reliable acknowledgement message.

16. An apparatus according to claim 9, wherein the first link and the second link are wireless links, and the communication system includes a satellite network.

17. An apparatus according to claim 9, wherein the apparatus is configured to operate as a PEP end point.

18. A system comprising:
a first PEP end point configured to provide a performance enhancing proxy function for a transport protocol connection of a mobile terminal over a first link of a communication system; and
a second PEP end point configured to communicate with the first PEP end point for the transport protocol connection,
wherein the first link of the communication system is subject to the PEP function, and
wherein the PEP end points are further configured to cease a spoofing function in response to initiation of a handover procedure of the transport protocol connection from the first link to a second link of the communication system, without teardown of the transport protocol connection, and wherein the handover will result in a replacement of the first link by the second link, and
wherein the shutdown procedure comprises:
generating, by the first PEP endpoint, a first spoof acknowledgement, corresponding to a received data segment, for notification of the stoppage of the spoofing function; and
transmitting a PEP shutdown message along with the first spoof acknowledgement to the second PEP endpoint.

19. A system according to claim 18, wherein the PEP end points are configured to communicate over a PEP backbone connection established over a satellite.

20. A system according to claim 18, wherein the PEP function comprises a spoofing protocol, and wherein the PEP end points are configured to initiate a graceful start of spoofing of the transport protocol connection after the handover.

* * * * *